April 14, 1970  H. MORDHORST  3,506,246
CONCRETE MIXING PLANT

Filed April 25, 1968  7 Sheets-Sheet 2

INVENTOR
HANS MORDHORST

By
Cushman, Darby & Cushman
ATTORNEYS

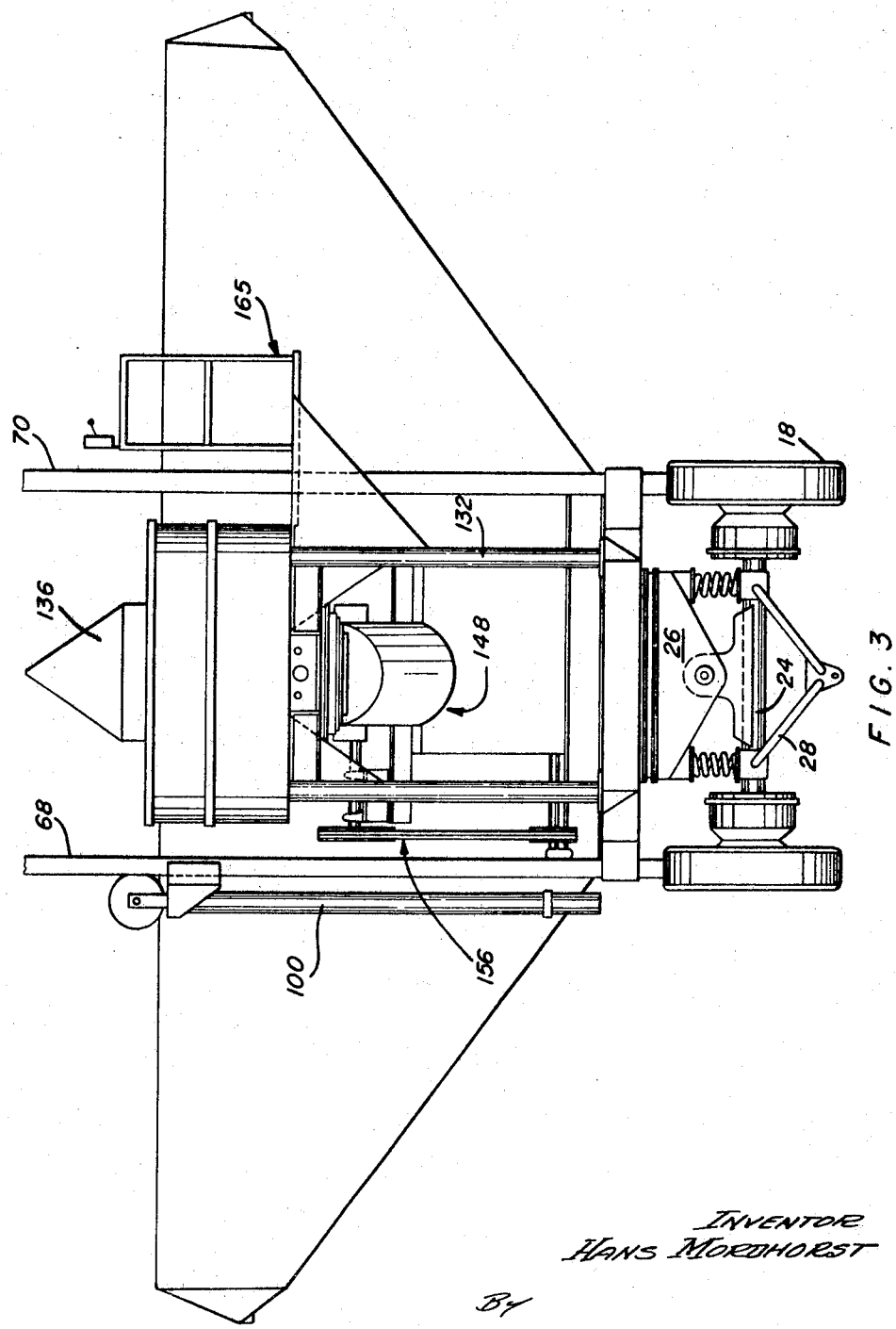

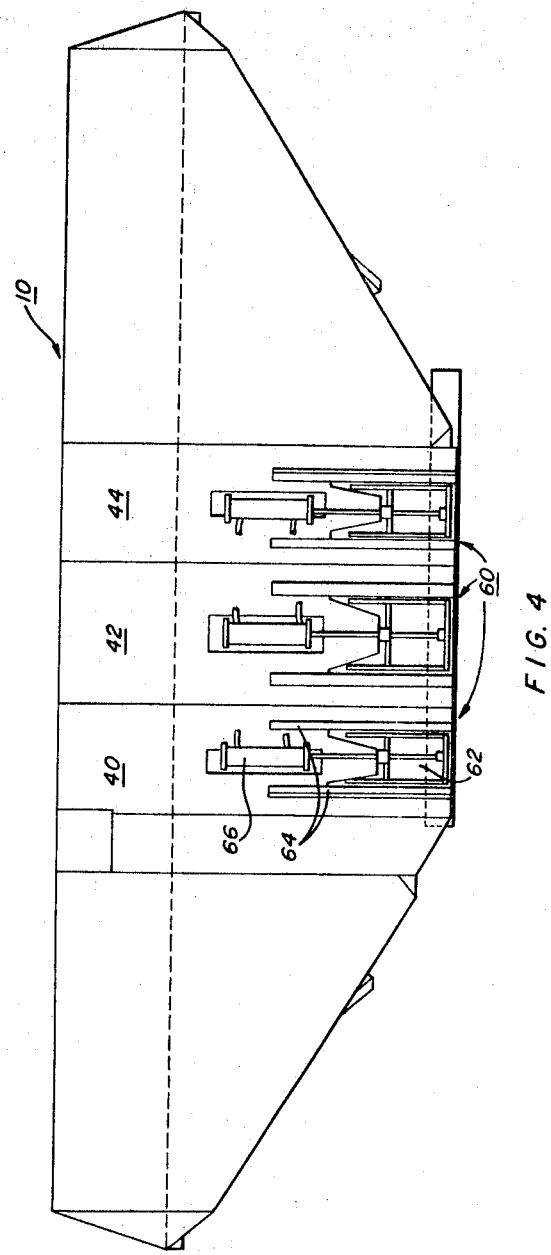

United States Patent Office 3,506,246
Patented Apr. 14, 1970

3,506,246
CONCRETE MIXING PLANT
Hans Mordhorst, Cloverdale, British Columbia, Canada, assignor to West Coast Concrete Supply Ltd., New Westminster, British Columbia, Canada
Filed Apr. 25, 1968, Ser. No. 724,152
Claims priority, application Canada, Jan. 15, 1968, 9,856
Int. Cl. B28c 7/04
U.S. Cl. 259—167
15 Claims

ABSTRACT OF THE DISCLOSURE

A portable concrete mixing plant including a chassis having a multi-compartment storage bin mounted thereon, the latter being provided with gates whereby aggregates may be selectively released from the bin compartments. A mixing means is mounted on the forward end of the chassis and a skip is provided which travels between a lower position whereat it receives material discharged through said gates to an upper unloading position whereat it discharges its load of aggregates into the mixing means. The bin, which in its operative position, is substantially wider than the remainder of the mixing plant, is arranged such that it may be rotated 90° about a vertical axis thereby to cause its longest dimension to lie parallel with the longitudinal axis of the chassis of the mixing plant and reducing the overall width of the mixing plant for highway travel.

---

This invention relates to apparatus for proportioning and mixing dry aggregates with a binder, and in particular to a concrete mixing plant which is so constructed and arranged as to be readily portable from one job site to another and which is extremely compact and simple in design.

The prior art has provided mobile mixing plants of the general type to which the invention relates comprising a mobile base section or chassis carrying the various components essential to the operation of the plant. Among these components are a bin or storage section for the aggregate, a mixing unit together with drive means, and a means for charging the mixer extending from the outlet openings of the bin to the inlet of the mixing chamber. The prior art has also provided various means for properly proportioning the various grades of aggregates before they are fed into the mixing chamber. An early example of a portable mixing plant is the structure shown in Canadian Patent 245,470 as well as the structure shown in Canadian Patent 279,744. A more recent example of a portable mixing plant is shown in Canadian Patent 466,841 issued July 25, 1950. This patent, in general, discloses a mixing plant including a multi-compartment storage bin for storing graded aggregates, a weigh-batching unit for weighing and proportioning the various aggregates, a skip unit for conveying the weighed batches of aggregates to the inlet of a mixing device, all of these components being mounted on a wheeled chassis to facilitate transportation from one job site to another. U.S. Patent 3,249,343 issued May 3, 1966 also illustrates a further form of portable mixing plant. This patent illustrates a mixing unit mounted on a forward end of a portable wheeled chassis and a multi-compartment storage unit mounted adjacent the opposite end of the chassis. The multi-compartment storage unit is so arranged that the partition walls thereof may be extended so as to enlarge the compartments for the mixing compounds. The structure is provided with a scraper unit which is capable of drawing the aggregates inwardly towards the end walls of the compartments, each of said end walls being provided with a gate which may be opened to discharge material to an inclined conveyor which extends from a point below the gates of the several compartments to the inlet of the mixing unit. The gates of the several mixing compartments are grouped in a semi-circular fashion such that they are capable of discharging to a common receiving point on the surface of the conveyor belt.

The prior art devices of the nature referred to above have met with varying degrees of success. Certain of these devices have met with considerable success in certain limited fields of application. In general, however, it may be said that the prior art devices suffer from one or more of the following shortcomings. Firstly, the prior art has failed to provide an effective yet relatively simple design of portable concrete mixing plant. Most of the portable plants are unduly complex and their attendant high initial cost makes them unavailable to any but relatively large contractors who can afford the initial expense. Furthermore, the prior art devices have, in general, been unduly bulky and of a relatively great weight, thus posing difficulties in transporting the unit from one site to another, particularly when such transportation involves travel along a public highway.

It is a general object of the present invention to provide apparatus including means for storing various grades of bulk aggregates, means for accurately weighing and proportioning batches of the various aggregates and delivering same to a mixing unit, all of such means, including the mixing unit, being incorporated in a unitary structure which may be readily transported from one job to another and which may be converted from operating to transporting condition and vice versa with a minimum of labour and with a minimum loss of time.

The portable mixing plant generally includes the following elements: an elongated chassis having a mixing device is mounted above the chassis adjacent one end thereof and adapted for mixing aggregates with a binding material. A storage bin having a plurality of compartments therein for receiving graded aggregates is mounted adjacent the opposite end of the chassis. Each one of the compartments has a gate means associated therewith operable to selectively release aggregates from said compartments to a level below the level of the mixing means. The storage bin compartments and the gate means are so grouped and arranged as to direct the aggregates released from the compartments to a common loading point. The mixing plant includes a charging apparatus positioned between the storage bin and the mixing device, such charging means including a skip arranged for travel between a lower position at the common loading point referred to above whereat said skip receives the aggregates discharged through the gate means, and an upper, discharge position at said mixing means whereat said skip discharges its load into the mixing device.

Preferably, the charging means includes tracks defining a path of travel for the skip between the uppermost and lowermost positions of the latter. The skip is preferably pivotally mounted such that upon application of a tipping moment force thereto, the skip will spill its load of aggregates into the mixing device. To effect such tipping action, suitable means are arranged in the path of travel of the skip to contact said skip at points spaced outwardly from the tipping axis of the latter thereby to apply a tipping force thereto when said skip reaches a position whereat tipping thereof effects discharge of its load into the mixing device. It is important to note that the means for effecting tipping of the skip when it reaches its uppermost position may be made adjustable in order to effect a change in the vertical position at which said skip is tipped thereby making the charging device adaptable for use with mixers of various heights.

The compartments of the storage bin are preferably provided with forwardly facing vertical wall portions, each of said wall portions having a gate means disposed therein. The vertical wall portions and the gates therein are grouped in a generally semi-circular arrangement thereby defining a concave depression in the side of the storage bin which faces towards the mixing device. The skip is provided with an outline contour shaped to correspond in part to the contour of the concave depression referred to above whereby the skip may be positioned very closely to the gate means when the skip is in its lower loading position thereby eliminating undesired spilling of the aggregates to regions other than the interior of the skip itself.

The track means which define a path travel for the skip is preferably arranged in a vertical plane. By this arrangement the overall length of the portable mixing plant may be reduced and this comprises a substantial advantage over prior art devices wherein a conveyor belt arrangement is utilized to transfer aggregates from a storage bin to the inlet end of the mixing chamber since such conveyor belt arrangement necessarily cannot be inclined to the horizontal at an angle greater than the angle of repose for the material being conveyed whereas the skip and its track means as set forth in the present disclosure may be arranged at any desired angle, preferably at right angles to the horizontal as mentioned above. The inclined conveyor devices of the prior art necessarily require that a substantial space be left between the aggregate compartments and the mixing device inlet; the present invention completely eliminates this disadvantage thus resulting in a more compact machine.

When the skip tracks referred to above are in the operative position, the uppermost end portions of the skip tracks project a substantial distance above the remaining portions of the machine, i.e., the storage compartments and the mixing device. In order to reduce the overall height of the mixing plant when such plant is in the inoperative condition or being transported from job site to another, the present invention provides skip track means hingedly attached together in their medial portions thereby to permit the upper track portions to be folded downwardly over portions of the mixing plant so as to reduce the overall height of the equipment.

In its preferred form, the present invention provides a means for charging the mixing device, such charging means including means adapted to sense the weight of aggregates being conveyed by the skip to the mixing device from the bin compartments. In order to achieve this, the apparatus in a specific embodiment, is provided with hydraulic cylinder means and a means operatively connecting the latter to the skip causes the latter to be raised upwardly or downwardly between its charging and discharging positions. The charging means preferably is provided with a suitable load cell capable of giving an indication of the weight being carried by the travelling skip, and a suitable gauge may be calibrated to give a direct indication of the weight of aggregate being carried by the skip at any time. Accordingly, the operator, by manipulating the gate means in the bin compartments referred to above may readily control and properly proportion the aggregates as they pass from the bin compartment into the travelling skip.

A further important aspect of applicant's invention resides in the provision of a portable mixing plant having a multi-compartment aggregate bin mounted on the chassis of the mixing plant with both the storage bin and the chassis being arranged to permit 90° rotation of the bin on such chassis about a vertical axis thereby to permit the longest horizontal dimension of the bin to lie parallel with the longitudinal axis of the chassis. Those skilled in the art will realize that it is difficult, if not impossible, to arrange a multi-compartment aggregate bin of substantial capacity such that in its operative position, its width does not exceed standard road clearance requirements when the plant is being towed by some other vehicle along a public highway. The present invention accommodates for this by providing a storage bin whose fore and aft dimension when the bin is in the operative position is not greater than standard road width requirements set by law. Hence, when the storage bin is rotated 90° about a vertical axis, this fore and aft bin dimension becomes disposed at right angles to the longitudinal axis of the mixing plant with the result being that the overall width of the mixing plant is substantially reduced. Of course, this procedure need only be carried out when the vehicle is to be transported from one job site to another along a route which entails travel over a public highway. If the mixing plant is simply moved from one job site to another without public highway travel being required, the mixing plant storage bin nor skip track means need not be rearranged in the manner referred to in the preceding paragraphs.

Further aspects and advantages of the invention will become apparent from the following detailed description of a preferred embodiment illustrated in the accompanying drawings in which:

FIG. 3 is a front elevation of the mixing plant shown in FIG. 1;

FIG. 4 is a front elevation of the multi-compartment storage bin illustrating the hydraulically actuated gate arrangement;

GENERAL ARRANGEMENT

Figure 1:
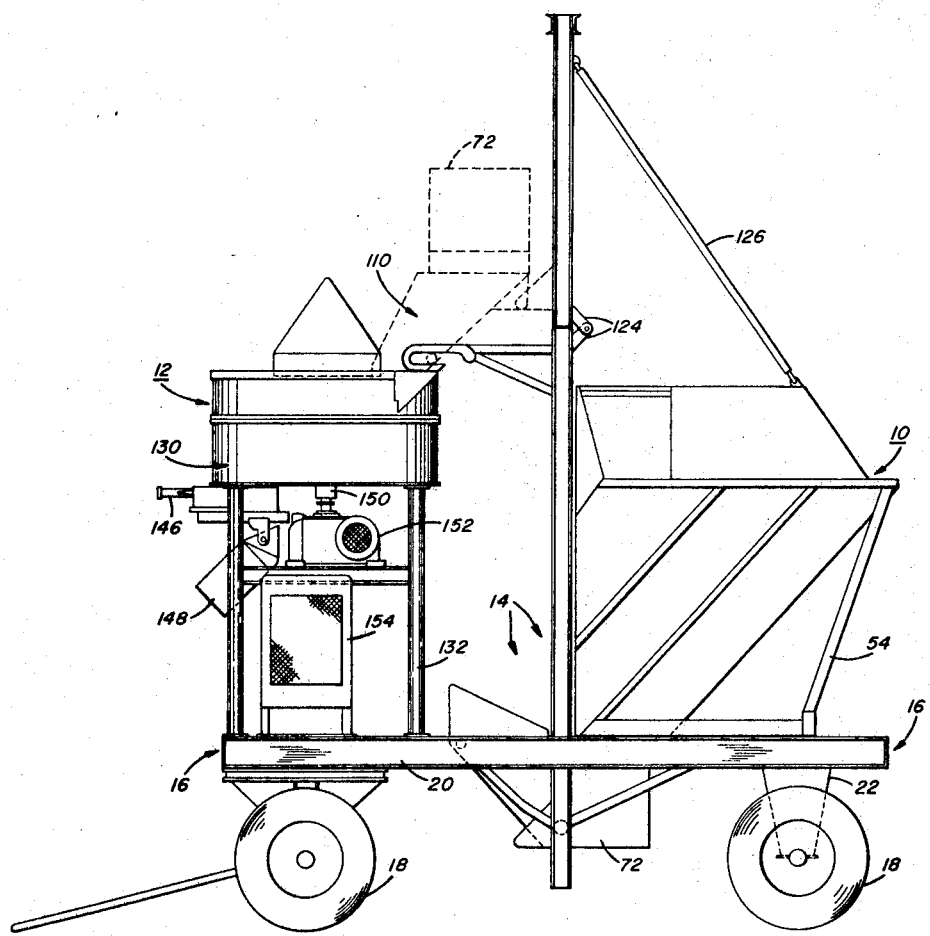
FIG. 1 is a side elevational view of a concrete mixing plant embodying the features of the invention and showing the mixing plant set up for use.
Figure 2:
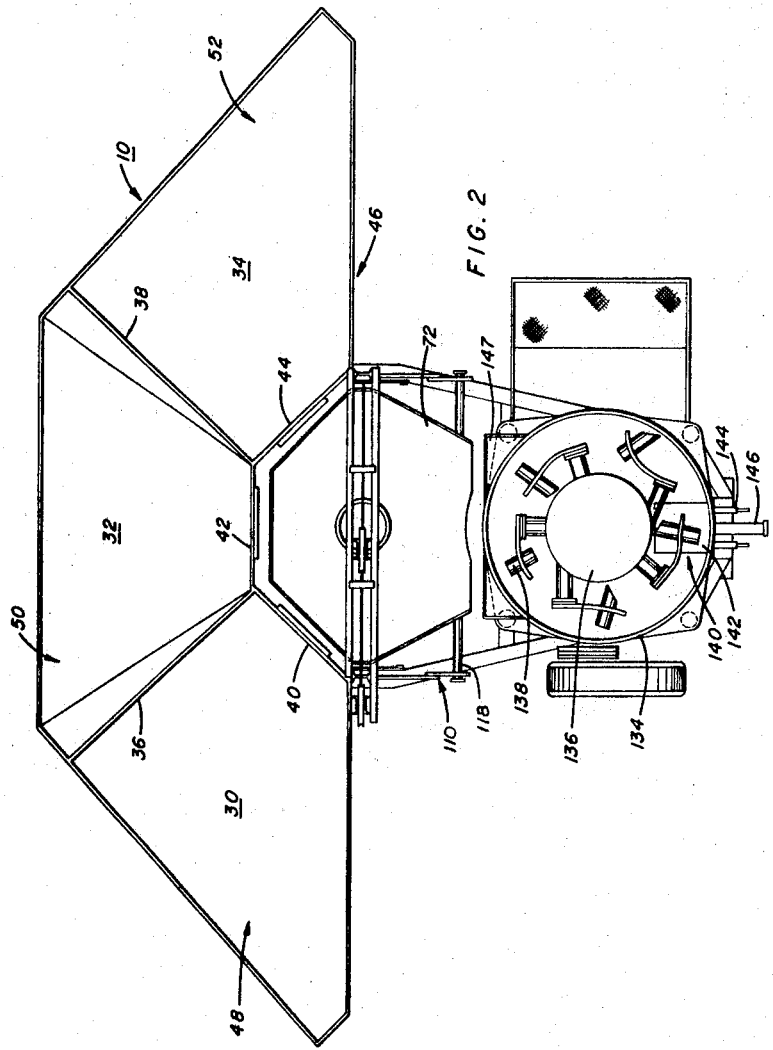
FIG. 2 is a plan view of the apparatus shown in FIG. 1.

Referring now to the drawings, particularly FIGS. 1, 2 and 3, there will be seen a concrete mixing plant including a multi-compartment storage bin 10 suitable for holding aggregate materials, a mixing device 12, including stirring means therein adapted to thoroughly stir the aggregates together with a binder material to produce a homogeneous concrete mixture, and a charging means 14 including a skip arranged for movement between lower and upper positions thereby to convey material from the storage bin 10 to the mixing device 12. All of the above mentioned components are mounted on a study chassis 16 having a plurality of wheels 18 mounted thereon so that the whole mixing plant may be towed along by a truck or tractor. The chassis 16 includes a generally rectangular frame 20 fabricated from I-beams and other suitable structural shapes welded together and adequately reinforced to provide the necessary strength and rigidity.

The rear end of the frame 20 is supported by a rear sub-assembly 22 including a suitable axle (not shown) having rear wheels 18 suitably attached to opposed ends thereof. The forward end of the frame 20 includes the spaced front wheels 18 attached to an axle 24, the latter being connected to frame 20 by means of a suitable pivot mounting 26 which provides freedom of the front axle 24 in both the yaw and roll planes. The front axle 24 is also desirably provided with a suitable tow bar arrangement 28 permitting the latter to be towed by a suitable vehicle as indicated previously. All of the vehicle wheels 18 are desirably provided with pneumatic tires to comply with highway regulations and permit rapid movement of the plant.

The entire plant may be provided with suitable jacks (not shown) so that a part of the weight of the entire mixing plant may be supported directly on the ground when the plant is in operation thus relieving the load on the pneumatic tires of wheels 18.

AGGREGATE STORAGE BIN ARRANGEMENT

FIGS. 1–4 inclusive give various views of the aggregate storage bin 10. The overall outline in plan of the storage bin 10 is clearly shown in FIG. 2 and it will be apparent from this drawing that the storage bin 10 is divided into three compartments designated 30, 32 and 34 by means of a pair of dividers 36 and 38 respectively. Each of the compartments 30, 32 and 34 include vertical wall portions 40, 42 and 44 respectively and it will be readily seen from the drawings that such wall portions 40, 42 and 44 are arranged in a generally semi-circular fashion with wall portions 40 and 44 being disposed on opposing sides of wall portion 42 such that said wall portions together form a generally concave depression in the forward face 46 of the storage bin 10. The compartments 30, 32 and 34 include forwardly and downwardly sloping wall portions 48, 50 and 52 respectively. The forwardly and downwardly sloping wall portions are connected at their respective lowermost ends to the vertical wall portions 40, 42 and 44 as previously referred to and by means of such sloping wall portions, aggregates placed in the several bin compartments tend to slide forwardly and come to rest against the vertical wall portions 40–44.

In order to prevent damage to the storage bin 10, the upper marginal edge thereof is reinforced with any suitable reinforcing means such as angle iron, or tubular members securely welded to the upper marginal edge. The storage bin 10 is particularly suited for loading by means of a standard bucket type loader and accordingly the loading faces of the several bin compartments should be arranged to have a width and a total height above the ground such that the storage bin may be charged with a standard bucket type loader. The entire storage bin 10 will be braced and reinforced by suitable structural shapes in a manner which will be apparent to those skilled in the art and may include support struts 54 as shown in FIG. 1 which serve to stabilize the bin structure.

Figure 4A:
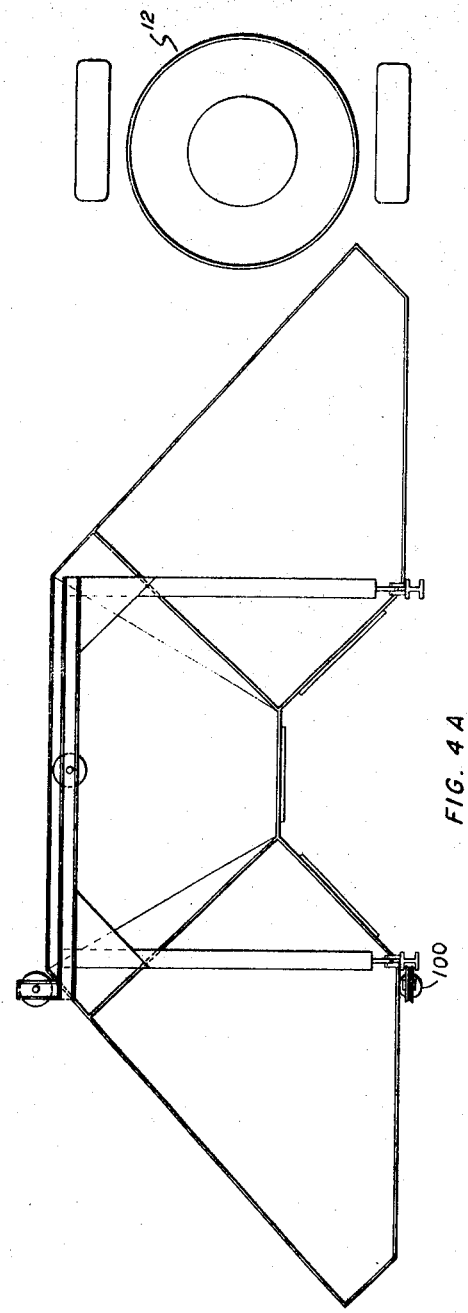
FIG. 4a is a semi-schematic drawing illustrating the manner in which the skip track and the storage bin is arranged when the mixing plant is in condition for highway travel.
Figure 5:
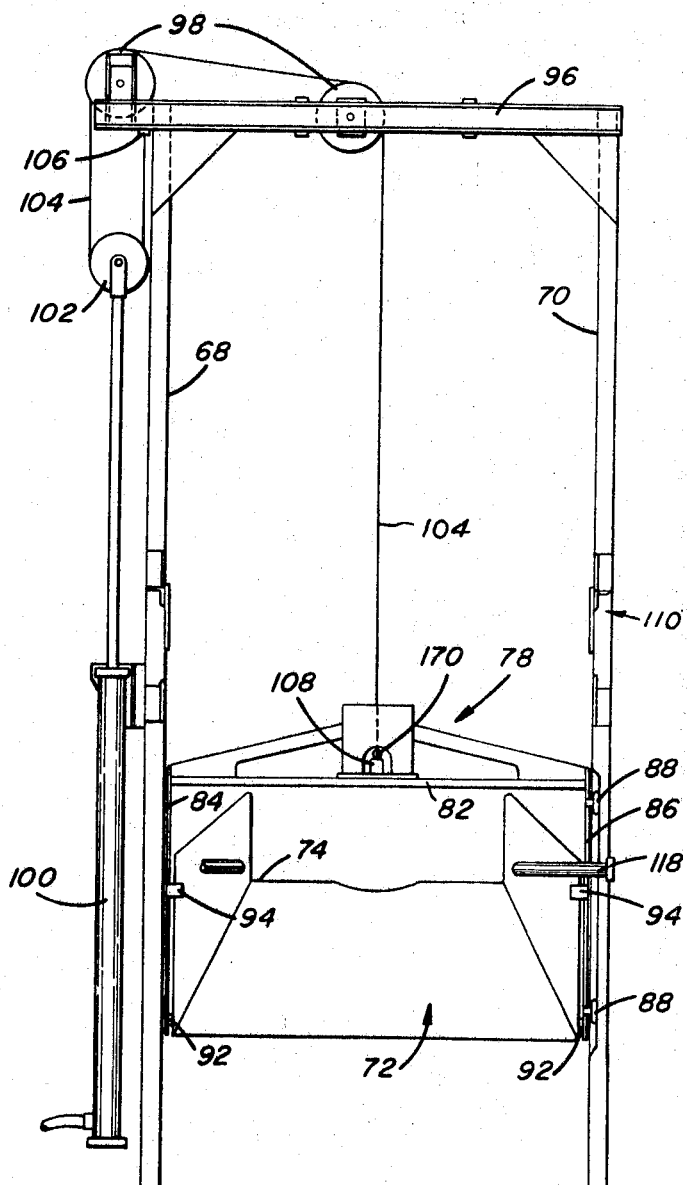
FIG. 5 is a front elevation of the mixer charging assembly including the skip, the skip track, and the hoisting means for the skip.

As mentioned previously, the storage bin 10 is mounted on the chassis 16 in such a manner that it may be readily detached and rotated through an angle of 90° to the position for highway travel as shown in the semi-schematic drawing FIG. 4a. In order to achieve this, the bin 10 is detachably secured to the chassis 16 by suitable screw fasteners or the like so that such fasteners may be readily detached when it is desired to transport the mixing plant on a public highway. After detaching the bin 10 from chassis 16, bin 10 may be lifted upwardly by a suitable hoist (not shown) and thereafter rotated until it occupies a position relative to the mixing device 12 shown in FIG. 4a. In order for this to be effective, it is apparent that the fore to aft dimension of the storage bin as a whole is chosen such that it is not substantially greater than the entire width of the remainder of the concrete mixing plant. The magnitude of this dimension will vary of course depending upon the highway regulations of the particular locality in which the concrete mixing plant is to be used; however, those skilled in the art will readily be able to determine such regulations and make suitable provisions for the fore-to-aft dimension of the bin accordingly. For the sake of safety, it is desirable that the bin 10 when turned to the position shown in FIG. 4a be securely fastened to the chassis 16 and for this reason, chassis 16 should be provided with suitable cross members as required in order to properly support the bin 10 and provide anchor points therefor when the bin is rotated to the position shown in FIG. 4a.

FIG. 4 shows a front elevation of the storage bin assembly 10 and clearly illustrates the three vertical wall portions 40, 42 and 44 previously referred to. In order to selectively permit the exit of aggregates from the previously referred to compartments 30, 32 and 34, the vertical wall portions are each provided adjacent the lowermost ends with hydraulically actuated gate assemblies 60. Each of the gate assemblies 60 includes a slideable gate member 62 arranged for up and down sliding movement between a pair of opposed guide channels 64. Each gate 62 is connected to the ram of an associated hydraulic cylinder 66. The hydraulic cylinders 66 permit gates 62 to be selectively opened and closed thereby to permit the operator to properly proportion the various grades of aggregates from the bins 30, 32 and 34 as such aggregates flow into the mixer charging assembly which will now be described.

MIXER CHARGING ASSEMBLY

For an understanding of the mixer charging assembly reference should be had to FIGS. 1–3, 5 and 6. It will be seen that the charging assembly includes spaced upright tracks 68 and 70. The track members 68 and 70 are preferably connected to the forward face of the storage bin 10 on either side of the concave depression effectively formed by the vertical wall portions 40, 42 and 44 previously described. Arranged for up and down travel between the track members 68 and 70 is a bucket or skip 72. The portion of the skip 72 facing forwardly of the mixing plant comprises a pour spout 74 connected to a body portion 76. As will be readily seen from FIG. 2, the rearwardly facing portion of body 76 is contoured to correspond in plan to the concave depression provided by the wall portions 40, 42 and 44, i.e. it is generally semi-circular. The skip 72 is provided with a skip hoist frame 78 including a cross head portion 82 and vertical side plate members 84 and 86 connected to opposing ends of the cross head 82 and extending downwardly therefrom. Each of the said plate members 84 and 86 are provided with a vertically spaced pair of rollers 88 which are adapted to engage in the opposing channels defined by track members 68 and 70. The lowermost ends of the side plate members 84 and 86 are each provided with a forwardly projecting portion 90 including a pivot point 92 whereby the skip 72 is connected to the skip hoist frame 78. The skip 72 is so constructed and arranged that, in either its empty or full condition, it has a tendency to rotate in the clockwise direction with reference to FIG. 6. In order to prevent clockwise rotation of skip 72 beyond the position shown in FIG. 6, small stop members 94 are affixed to opposing sides of skip 72; stops 94 bear against the side plates 84 and 86 in the absence of any outside tipping force applied to skip 72.

The uppermost ends of the tracks 68 and 70 are joined by means of a horizontally disposed cross piece 96 upon which are mounted a spaced pair of sheaves 98. Secured to the bin 10 by suitable bracket means is a hydraulic cylinder 100 which provides the force necessary to raise the skip 72 together with its load of aggregate from its lower position to an upper tipping position adjacent the inlet of the mixing unit 12. On the upper end of the ram of the cylinder 100 is a further sheave 102 suitably connected thereto. A strong cable 104 is connected at anchor point 106 to the outwardly projecting portion of the member 96 and is thereafter trained about the sheave 102 and the sheaves 98 and thence passes downwardly along a line approximately midway between the track members 68 and 70 and is then connected at anchor point 108 to the skip hoist frame 78. Since the hoist cable arrangement shown requires the cylinder 100 to exert a force equal to twice the tension in cable 104, the length of the stroke of cylinder 100 must be equal to one-half the distance between the uppermost and lowermost positions of the skip 72.

Figure 6:
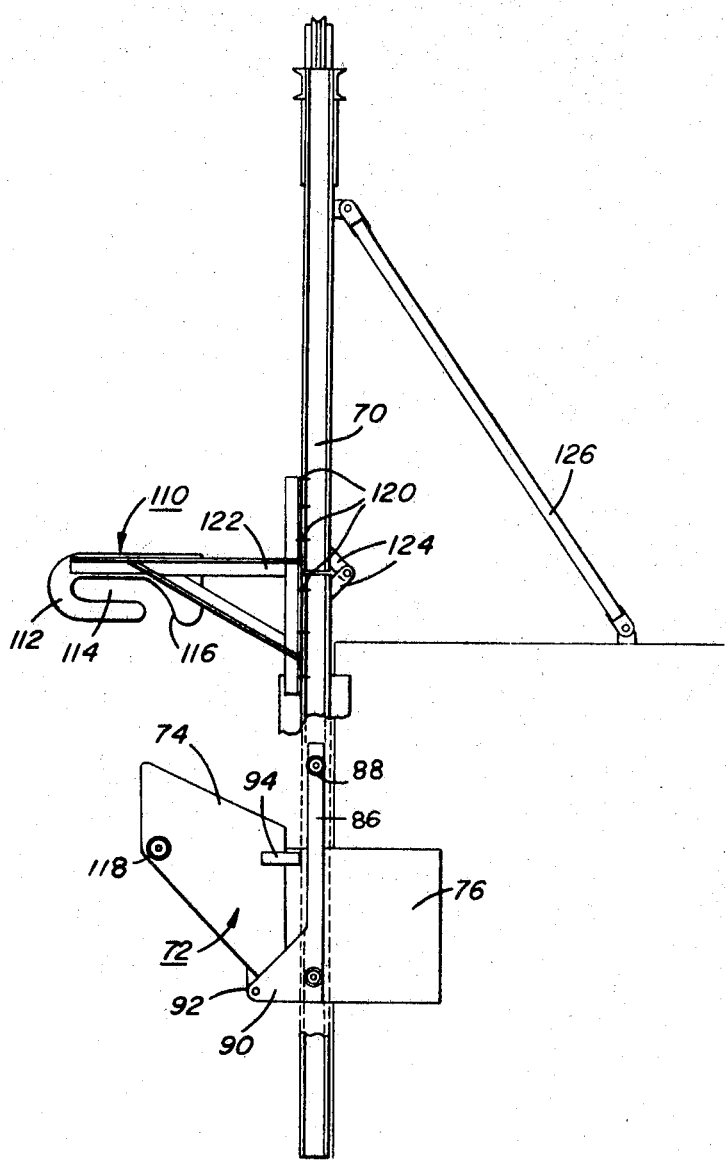
FIG. 6 is a side elevational view of the assembly shown in FIG. 5 and having a cut-away portion therein so as to illustrate further details of the apparatus.

The skip 72 is shown in dotted lines in FIG. 1 in its upper discharge position. In order to effect tipping and hence a discharge of the aggregates from skip 72, mounted on each of the vertical track members 68 and 70 are trip hook assemblies 110, one of which is clearly shown in FIG. 6. Each of the trip hook assemblies 110 comprises the trip hook 112 including an elongated slot 114 provided with a smoothly contoured downwardly directed entrance portion 116. The skip 72 is provided adjacent the outermost end of the spout portion 74 with a pair of oppositely and outwardly directed pins 118, only one of which is fully shown in FIG. 5. The pin members 118 are so arranged such that upon upward movement of the skip 72, the pin members enter into the entrance portions of the trip hooks 112 and then travel into the horizontally disposed slot portions 114. Continued upward movement of the skip hoist frame 78 causes the skip 72 to rotate counterclockwise until it occupies a position substantially as shown by dotted lines in FIG. 1. After the skip has discharged its load of aggregates into the mixing unit 12, the skip hoist frame 78 is lowered causing the pin members 118 to be withdrawn from the trip hooks 112 whereupon the skip 72 assumes its normal rest position as shown in FIG. 6.

The trip hooks 112 are connected to the vertical tracks 68 and 70 by means of brackets 122. In order to provide for a vertical adjustment in the height of the trip hooks 112, the vertical tracks 68 and 70 are provided with a plurality of spaced apertures 120 designed to accommodate threaded fasteners connecting the bracket portions 122 to the track members at a plurality of vertically spaced positions. In this manner, the height at which discharge of the skip 72 is effected may be varied thereby to accommodate for differing overall heights of the mixer unit 12 and also to effect any further adjustment which may be required during the normal operation of the mixing plant.

As mentioned previously the present invention provides means whereby the overall height of the mixing plant may be reduced thereby to permit ready movement of the mixing plant along the public highways without the danger of the mixing plant striking an overhead object such as a bridge. In order to provide this height reduction, the tracks 68 and 70 are each split into two sections. The manner in which these two sections are hinged together is shown clearly in FIG. 6. It will be seen from FIG. 6 that the upper and lower track sections are hinged together by means of hinge plates 124. The hinge plates 124 are connected together by a suitable pivot pin means and accordingly pivotal movement of track members 68 and 70 together with cross piece 96 is permitted. In order to achieve this reduction in height, the brace members 126 are removed, the trip hook assemblies 110 are removed and thereafter the entire upper portion of the skip track frame including tracks 68, 70 and cross piece 96 may be lowered rearwardly of the machine until the said upper portion lies across the storage bin 10 in the manner shown by the dotted lines in FIG. 4a.

CONCRETE MIXING UNIT

The concrete mixing unit 12 comprises a turbine type pan mixer 130 positioned adjacent the forward end of the mixing plant and positioned a predetermined distance above the chassis 16. The mixer 130 is supported above the chassis 16 by means of four vertical posts 132. The mixer 130 includes a generally cylindrical drum 134 within which is mounted a rotor head 136. The rotor head 136 has a plurality of mixer paddles 138 secured thereto, such mixer paddles 138 being of varying configurations well known in the prior art in order to provide for proper mixing of the batch. The paddles 136 may be resiliently mounted on the rotor 136 thereby to enable paddles 138 to ride up over obstructions in the batch which might tend to cause a breakage of the paddles. The bottom wall of the mixer drum is provided with a hydraulically actuated exit gate arrangement 140 shown in FIG. 2. This assembly includes a gate 142 mounted for sliding movement in a horizontal plane on spaced guide members 144. A hydraulic cylinder 146 operatively connected to gate 142 permits the operator to readily open gate 142 to permit the batch of mixed concrete to escape from mixer drum 134 into a swivel chute arrangement 148 best shown in FIGS. 1 and 3. In order to accommodate the spout portion 74 of the travelling skip 72, the upper rearwardly facing portion of the mixer drum 134 is provided with projecting portions 147 designed and dimensioned in accordance with the dimensions of the forementioned spout portion 74.

The rotor 136 is driven in rotation about a vertical axis via vertical shaft 150 which extends from a gear box 152 positioned immediately below the drum 134 of the mixer. The gear box 152 is supported on a sub-frame assembly affixed securely to the four vertical post members 132 previously referred to. Mounted above chassis 16 immediately below the gear box 152 is a suitable motor or engine 154 which supplies motive power for driving the rotor 136. The output shaft of the motor or engine drives the input of gear box 152 by means of the pulley and belt arrangement 156 shown in FIG. 3. A suitable hydraulic pump (not shown) may also be positioned adjacent the engine 154 and may be driven from the latter thereby to supply hydraulic fluid under pressure to the several hydraulic cylinders described previously.

MIXING PLANT CONTROLS

The concrete mixing plant is provided with a suitable hydraulic control system for effecting individual operation of the three gate operating cylinders 66 and also operation of the skip raising cylinder 100. Since hydraulic systems for effecting operation of such cylinders are extremely well known in the prior art, no further description of the same is deemed necessary here. It is sufficient to say that a hydraulic control panel is positioned in a convenient location whereby an operator may readily observe the operation of the plant and effect control of the various instrumentalities described previously. For the sake of convenience, such control panel is shown in FIG. 3 as being mounted to the right-hand side of the machine at a level slightly above the level of the mixer drum 134. An operator's platform 165 is secured to vertical post members 132 and positioned on the right-hand side of the machine as viewed in FIG. 3; with the operator positioned in such elevated position, he may readily observe the progress of the mixing operation in the mixing drum 134 and may readily direct the up and down movement of the skip 72. One important feature is the provision of a load cell 170 connected in the skip hoist assembly and arranged to sense the weight of aggregates carried by the skip. Load cell 170 is conveniently connected at the point of connection 108 between hoist cable 104 and cross head 82 of skip hoist frame 78. The pressure transducer 170 is connected to suitable electrical circuitry (not shown) capable of generating a signal which may be fed to a suitable meter positioned in operator's control panel thereby to give an indication of the weight of aggregates carried by skip 72. By means of this load cell arrangement, the weighing and mixing mechanisms become effectively one and the same thing thus providing a considerable advance over many prior art systems wherein the weighing mechanism is distinct and separate from the hoisting arrangement.

OPERATION

The operation of the mixing plant will be obvious to those skilled in the art from a reading of the foregoing description. However, it seems desirable to enumerate here briefly the several operations involved.

The several grades of aggregates are loaded into the compartments 30, 32 and 34 of bin 10. By virtue of the downwardly and forwardly sloping bottom walls 48, 50 and 52 of the above referred to compartments, the aggregates slide forwardly until they rest against the vertical wall portions 40, 42 and 44 of bin 10. The operator then shifts a suitable hydraulic control valve thereby lowering the skip downwardly to its loading position as shown in FIG. 1. In this position the skip, by virtue of its configuration, is positioned just below and closely adjacent to the gate assemblies 60 shown in FIG. 4. By means of the hydraulic system, the operator selectively operates the gate operating cylinders 66 thereby to permit measured amounts of aggregates to fall into the skip 72. After the desired quantities of aggregates have been placed in the skip 72, the gates 62 are closed and the operator actuates the aforementioned control valve to effect raising of the skip 72 upwardly towards its upper discharge position. As the skip 72 approaches upper discharge position, the pins 118 affixed to skip 72 enter into engagement with the tripper hook arrangements 110 thereby effecting tipping of skip 72 upon continued upward movement of its supporting hoisting frame. After the load of aggregates contained in the skip has been discharged into the mixer drum 134, the skip is lowered downwardly and the above described procedure repeated until the desired charge has been fed into the mixer drum 134.

In the practice of the present invention, it is contemplated that the charge of cement will be fed into the mixer drum 134 by independent means not shown in the drawings. Such means conveniently comprise a worm type of feed arrangement; alternatively a suitable conveyor belt arrangement could convey the desired quantity of cement to the mixer for each batch. The required amount of liquid to make up the batch can readily be fed to the mixer drum by means of suitable pumping and piping means not shown.

After the entire charge has been placed into the mixing drum, rotation of the rotor 136 and its associated paddles 138 is effected for a sufficient period of time to allow proper and complete mixing of the batch of concrete. After the batch has been fully mixed the hydraulic cylinder 146 is actuated thereby to open the mixer drum discharge gate 142, whereupon the charge leaves the mixing plant via the discharge spout 148 adjacent the forward end of the plant.

I claim:

1. A portable mixing plant comprising; an elongated chassis, mixing means mounted on and above said chassis adjacent one end thereof for mixing aggregates with a binding material, a storage bin having a plurality of compartments therein for receiving aggregates mounted on and adjacent to the other end of the chassis, gate means associated with each said compartment operable to selectively release aggregates from said compartments at a level below the level of said mixing means, the storage bin compartments including respective generally upright wall portions with each of said gate means being disposed in a respective one of said upright wall portions, said compartments including respective further wall portions each of which slopes downwardly and forwardly towards a respectively associated one of said upright wall portions whereby aggregates placed in said bin compartments slide forwardly under the influence of gravity and come to rest against said generally upright wall portions and against the gate means disposed therein, said storage bin and said gate means being constructed and arranged to direct said aggregates to a common loading point, and charging means intermediate said storage bin and said mixing means including a skip arranged for travel between a lower position at said common loading point whereat said skip receives the aggregates discharged through said gate means, and an upper, discharge position at said mixing means.

2. A portable mixer according to claim 1 wherein said charging means includes track means defining a path of travel for said skip, said skip being pivotally mounted to tip material therefrom upon application thereto of a tipping moment of force, and means disposed in the path of travel of said skip and arranged to contact a portion of the latter as the skip approaches its discharge position thereby to apply said tipping force moment thereto to effect discharge of aggregates from said skip into said mixer.

3. A portable mixing plant comprising; an elongated chassis, mixing means mounted on and above said chassis adjacent one end thereof for mixing aggregates with a binding material, a storage bin having a plurality of compartments therein for receiving aggregates mounted on and adjacent to the other end of the chassis, gate means associated with each said compartment operable to selectively release aggregates from said compartments at a level below the level of said mixing means, said storage bin and said gate means being constructed and arranged to direct said aggregates to a common loading point, and charging means intermediate said storage bin and said mixing means including a skip arranged for travel between a lower position at said common loading point whereat said skip receives the aggregates discharged through said gate means, and an upper, discharge, position at said mixing means, said charging means including track means defining a path of travel for said skip, said skip being pivotally mounted to tip material therefrom upon application thereto of a tipping moment of force, and means disposed in the path of travel of said skip and arranged to contact a portion of the latter as the skip approaches its discharge position thereby to apply said tipping force moment thereto to effect discharge of aggregates from said skip into said mixer, said means disposed in the path of travel of said skip being adjustably arranged to permit vertical adjustment of the discharge position of the skip.

4. A portable mixing plant comprising; an elongated chassis, mixing means mounted on and above said chassis adjacent one end thereof for mixing aggregates with a binding material, a storage bin having a plurality of compartments therein for receiving aggregates mounted on and adjacent to the other end of the chassis, gate means associated with each said compartment operable to selectively release aggregates from said compartments at a level below the level of said mixing means, said storage bin and said gate means being constructed and arranged to direct said aggregates to a common loading point, and charging means intermediate staid storage bin and said mixing means including a skip arranged for travel between a lower position at said common loading point whereat said skip receives the aggregates discharged through said gate means, and an upper, discharge, position at said mixing means, said charging means including track means defining a path of travel for said skip, said skip being pivotally mounted to tip material therefrom upon application thereto of a tipping moment of force, and means disposed in the path of travel of said skip and arranged to contact a portion of the latter as the skip approaches its discharge position thereby to apply said tipping force moment thereto to effect discharge of aggregates from said skip into said mixer, said means disposed in the path of travel of said skip comprising catch means, said catch means being offset from the pivot axis of the skip in a direction towards said mixing means and said skip including elements thereon adapted to engage said catch means to tip said skip.

5. A portable concrete mixer according to claim 4 wherein the catch means include slotted portions having entrance sections contoured to guide the elements of the skip into the slotted portions of the catch means upon upward movement of the skip when the latter reaches its discharge position.

6. A portable mixing plant comprising; an elongated chassis, mixing means mounted on and above said chassis adjacent one end thereof for mixing aggregates with a binding material, a storage bin having a plurality of compartments therein for receiving aggregates mounted on and adjacent to the other end of the chassis, gate means associated with each said compartment operable to selectively release aggregates from said compartments at a level below the level of said mixing means, said storage bin and said gate means being constructed and arranged to direct said aggregates to a common loading point, and charging means intermediate said storage bin and said mixing means including a skip arranged for travel between a lower position at said common loading point whereat said skip receives the aggregates discharged through said gate means, and an upper, discharge, position at said mixing means, the compartments of the storage bin each including a forwardly facing generally upright wall portion with each of the latter having one of said gate means disposed therein, said generally upright wall portions and the gates therein being grouped in a semi-circular arrangement to define a concave depression in the side of the storage bin facing towards the mixing means, said skip having an outline contour shaped to correspond in part to the contour of said depression whereby said skip may be positioned closely to said gate means when the skip is in its lower loading position.

7. A portable mixer according to claim 6 wherein the charging means includes track means defining a path of travel for the skip, said track means being arranged in a generally vertical plane.

8. A portable mixing plant according to claim 7 wherein each of the track means defining a path of travel for the skip comprises two portions, a lowermost track portion being, rigidly fixed to the mixing plant, and an uppermost track portion being hinged to the lowermost portion to permit the upper track portions to be folded downwardly to reduce the overall height of the mixing plant.

9. A portable mixing plant according to claim 8 wherein the charging means includes a hydraulic cylinder and means operatively connecting the same to said skip to cause the latter to travel between said upper and lower positions, and means for sensing the weight of aggregates discharged into said skip from the bin compartments.

10. A portable mixing plant according to claim 6 wherein said storage bins and said chassis are constructed and arranged to permit 90° rotation of the bin on said chassis thereby to permit the longest horizontal dimension of said bin to lie parallel with the longitudinal axis of the chassis thereby reducing the overall width of the mixing plant for highway travel.

11. A portable concrete mixer according to claim 6 wherein the storage bin compartments include respective further wall portions which slope downwardly towards respectively associated ones of said generally upright wall portions whereby aggregates placed in said compartments slide forwardly and rest against said upright wall portions and the gate means disposed therein.

12. A portable mixing plant comprising: an elongated chassis, mixing means mounted on said chassis for mixing aggregates with a binding material, and a multi-compartment storage bin having material discharge means, said storage bin having a fore-to-aft overall dimension when such bin is in the operative position on said chassis which is substantially smaller than the maximum dimension of such bin measured substantially at right angles to said first mentioned dimension in a horizontal plane, said maximum dimension being substantially greater than the overall width of the remainder of the mixing plant, said storage bin and said chassis being arranged to permit 90° rotation of the entire bin with respect to said chassis in a horizontal plane and in such a manner as to permit the maximum dimension of said bin to lie parallel to the longitudinal dimension of said chassis thereby permitting a reduction in the overall width dimension of the mixing plant and facilitating highway travel of the latter, and charging means operatively associated with said storage bin and said mixing means for transferring materials stored in such bin to the mixing means.

13. A portable mixing plant according to claim 12 wherein said charging means comprises a skip track means permitting travel of said skip between a loading position at the material discharge means of said bins and an unloading position at said mixing means, said skip track means including a position projecting above the remainder of the mixing plant when in the operative position and adapted to be downfolded to provide road clearance when such plant is travelling.

14. A portable mixing plant comprising: an elongated chassis, mixing means mounted above said chassis adjacent one end thereof for mixing aggregates with a binding material, a storage bin having a plurality of compartments therein for receiving aggregates mounted adjacent the other end of the chassis, gate means associated with each said compartment operable to selectively release aggregates from said compartments at a level below the level of said mixing means, said storage bin and said gate means being constructed and arranged to direct said aggregates to a common loading point, and charging means intermediate said storage bin and said mixing means including a skip arranged for travel between a lower position at said common loading point whereat said skip receives the aggregates discharged through said gate means, and an upper discharge, position at said mixing means, wherein the compartments of the storage bin each include a forwardly facing vertical wall portion with each of the latter having one of said gate means disposed therein, said vertical wall portions and the gates therein being grouped in a semi-circular arrangement to define a concave depression in the side of the storage bin facing towards the mixing means, said skip having an outline contour shaped to correspond in part to the contour of said depression whereby said skip may be positioned closely to said gate means when the skip is in its lower loading position, said storage bin having a fore-to-aft overall dimension when such bin is in the operative position on said chassis which is substantially smaller than the maximum dimension of such bin measured substantially at right angles to said first mentioned dimension in a horizontal plane, said maximum dimension being substantially greater than the overall width of the remainder of the mixing plant, said storage bin and said chassis being arranged to permit rotation of said bin with respect to said chassis in a horizontal plane and in such a manner as to permit the maximum dimension of said bin to lie parallel to the longitudinal dimension of said chassis thereby permitting a reduction in the overall width dimension of the mixing plant and facilitating highway travel of the latter.

15. A portable mixing plant comprising: an elongated chassis, mixing means mounted on said chassis for mixing aggregates with a binding material, and a multi-compartment storage bin having material discharge means, said storage bin having a fore-to-aft overall dimension when such bin is in the operative position on said chassis which is substantially smaller than the maximum dimension of such bin measured substantially at right angles to said first mentioned dimension in a horizontal plane, said maximum dimension being substantially greater than the overall width of the remainder of the mixing plant, said storage bin and said chassis being arranged to permit 90° rotation of the entire bin with respect to said chassis in a horizontal plane and in such a manner as to permit the maximum dimension of said bin to lie parallel to the longitudinal dimension of said chassis thereby permitting a reduction in the overall width dimension of the mixing plant and facilitating highway travel of the latter, and charging means operatively associated with said storage bin and said mixing means for transferring materials stored in such bin to the mixing means, and wherein the compartments of the storage bin each include a forwardly facing generally vertical wall portion with each of the latter having one of said gate means disposed therein, said generally vertical wall portions and the gates therein being grouped in a semi-circular arrangement to define a concave depression in the side of the storage bin facing towards the mixing means, said skip having an outline contour shaped to correspond in part to the contour of said depression whereby said skip may be positioned closely to said gate means when the skip is in its lower loading position.

References Cited

UNITED STATES PATENTS

| | | | |
|---|---|---|---|
| 3,145,977 | 8/1964 | August | 259—167 X |
| 3,189,327 | 6/1965 | Domenighetti | 259—154 |
| 3,244,411 | 4/1966 | Kuhner | 259—165 |
| 3,249,343 | 5/1966 | Siebeneicher | 259—165 X |

ROBERT W. JENKINS, Primary Examiner